United States Patent
Au et al.

(10) Patent No.: US 6,842,483 B1
(45) Date of Patent: Jan. 11, 2005

(54) DEVICE, METHOD AND DIGITAL VIDEO ENCODER FOR BLOCK-MATCHING MOTION ESTIMATION

(75) Inventors: Oscar Chi-Lim Au, Kowloon (HK); Ming Lei Liou, Kowloon (HK); Alexandros Tourapis, Kowloon (HK); Guobin Shen, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 338 days.

(21) Appl. No.: 09/659,597

(22) Filed: Sep. 11, 2000

(51) Int. Cl.[7] ............................................... H04N 7/12
(52) U.S. Cl. ................................................ 375/240.16
(58) Field of Search ...................... 375/240.12–240.17, 375/240.24; 382/232, 236, 238; H04N 7/12, 7/32

(56) References Cited

U.S. PATENT DOCUMENTS

| | | |
|---|---|---|
| 4,661,849 A | 4/1987 | Hinman |
| 4,838,685 A | 6/1989 | Martinez et al. |
| 4,853,775 A | 8/1989 | Rouvrais et al. |
| 5,089,887 A | 2/1992 | Robert et al. |
| 5,428,403 A | 6/1995 | Andrew et al. |
| 5,497,338 A | 3/1996 | Miyake et al. |
| 5,583,580 A | 12/1996 | Jung |
| 5,594,504 A | 1/1997 | Ebrahimi |
| 5,608,458 A | 3/1997 | Chen et al. |
| 5,610,658 A | 3/1997 | Uchida et al. |
| 5,635,994 A | 6/1997 | Drexler et al. |
| 5,668,600 A | 9/1997 | Lee |
| 5,712,799 A | 1/1998 | Farmwald et al. |
| 5,717,470 A | 2/1998 | Jung |
| 5,721,595 A | 2/1998 | Chen et al. |
| 5,731,850 A | 3/1998 | Maturi et al. |
| 5,739,872 A | 4/1998 | Kim et al. |
| 5,742,710 A | 4/1998 | Hsu et al. |
| 5,754,237 A | 5/1998 | Jung |
| 5,757,668 A | 5/1998 | Zhu |
| 5,764,787 A | 6/1998 | Nickerson |
| 5,793,985 A | 8/1998 | Natarajan et al. |
| 5,796,855 A | 8/1998 | Lee |
| 5,812,199 A | 9/1998 | Lu et al. |
| 5,818,969 A | 10/1998 | Astle |
| 5,838,828 A | 11/1998 | Mizuki et al. |
| 5,926,231 A | 7/1999 | Jung |
| 6,430,317 B1 * | 8/2002 | Krishnamurthy et al. ... 382/236 |
| 6,549,576 B1 * | 4/2003 | Moriyoshi ............. 375/240.16 |

* cited by examiner

*Primary Examiner*—Richard Lee
(74) *Attorney, Agent, or Firm*—Burns, Doane, Swecker & Mathis, L.L.P.

(57) ABSTRACT

A device or method for video compression uses a technique in which changes in the image are encoded by motions of block of the image and signals indicating evolutions in the block. To determine the motions of the blocks of a each frame, a search is performed for a similar block of a previous frame based on points of the previous frame which are arranged in successive diamond shaped zones. The diamond shaped zones may be centred on the position of the block in previous frame, or one or more predicted motions of the block. The method terminates according to criteria defined using thresholds.

15 Claims, 6 Drawing Sheets

|      | MV2 | MV3 |
|------|-----|-----|
| MV1  | MV  |     |

MV : Current motion vector
MV1: Previous motion vector
MV2: Above motion vector
MV3: Above right motion vector

DEVICE, METHOD AND DIGITAL VIDEO ENCODER FOR BLOCK-MATCHING MOTION ESTIMATION

FIELD OF THE INVENTION

This invention relates generally to digital video compression, and more particularly to a video compression system using block-matching motion estimation and having both device and method aspects. It further relates to a computer program product, such as a recording medium, carrying program instructions readable by a computing device to cause the computing device to carry out a method according to the invention.

BACKGROUND

Due to the huge size of raw digital video data, compression must be applied to video signals so that they may be transmitted and stored. There are many international standards for video compression including ISO MPEG-1, MPEG-2, MPEG4, ITU-T H.261, H263, H263+. These are commonly used in video distribution such as in VCD, DVD, DVB, HDTV, video conferencing, video editing, video streaming over the Internet, etc.

One common feature among these standards is that motion estimation is used to reduce temporal redundancy inherent in video sequences. In motion estimation, each frame (or picture) is divided into square blocks typically containing 16×16 picture elements (or pixels). For each such present block, full exhaustive search is typically performed within a predefined search area of a reference frame which may be the previous frame or a future frame in a video sequence, to find the block in the reference frame which is most similar to the present block according to the predefined matching criterion (In fact, there are algorithms which use a plurality of reference frames, "multiframe algorithms"; in MPEG, we use a previous frame (possibly with a distance greater than 1) and a forward (future) frame (again possibly with a distance greater than 1). The matching criterion is typically the sum of the absolute differences (SAD):

$$SAD = \Sigma_{i=1}^{18} \Sigma_{j=1}^{16} |Xij - Yij|$$

for a 16×16 block, where X ij is the value at pixel (i,j) of an image frame to be encoded, and Y ij is the value at pixel (i,j) of the reference frame. Alternatively, other common matching criteria include the sum of square differences (SSD):

$$SSD = \Sigma_{i=1}^{18} \Sigma_{j=1}^{18} (Xij - Yij)^2,$$

the mean absolute difference (MAD) (which is SAD divided by 256) and the mean square error (MSE) or mean square difference (MSD) which are both equal to SSD divided by 256.

The difference in location of present block and the most similar block of the reference frame is called the motion vector of the present block. Thus, the present block may be compressed as (i) the motion vector and (ii) the difference between the present block and the most similar block corresponding to the motion vector of the reference frame.

It is well known that the exhaustive full search (FS) is very slow, typically requiring $10^9$ operations per second for standard television signals. It is highly desirable to develop fast motion estimation algorithms without significantly affecting the visual quality of the image which can be reproduced from the compressed image signal.

U.S. Pat. No. 5,757,668 proposed a motion estimation in which the search for a matching block terminated as soon as the matching criterion (e.g. SAD) for a block of the reference signal was below a threshold. The threshold was adaptive.

U.S. Pat. No. 4,838,685, U.S. Pat. No. 4,661,849, U.S. Pat. No. 4,853,775, and U.S. Pat. No. 5,089,887 start with an initial motion vector estimate, and refined the estimate by a velocity field gradient descent. Such iterative gradient descent algorithms tend to be slow.

U.S. Pat. No. 5,583,580, U.S. 5,635,994, U.S. Pat. No. 5,610,658, U.S. Pat. No. 5,717,470, U.S. Pat. No. 5,926,231, U.S. Pat. No. 5,594,504, U.S. Pat. No. 5,754,237, U.S. Pat. No. 5,731,850, U.S. Pat. No. 5,608,458 and U.S. Pat. No. 5,742,710 propose motion vector estimation using a hierarchical search. Generally in such techniques a first level searching is performed using a subsampled version of the frame; in a second level, local searching is performed. Such techniques are particularly inefficient in small size video such as QCIF.

U.S. Pat. No. 5,8189,69 proposes estimating motion vectors from immediately adjacent blocks and those in previous images. If the region is uniform, such a search may be fast. Otherwise, a more extensive search is required, and local fine scale search is performed. This approach does not take into account consideration of the bit rate requirement of the motion vectors. For complex scenes the complexity of the algorithm is great. Similar techniques, which are accompanied by the same weaknesses, are proposed in U.S. Pat. No. 5,81,969 and U.S. Pat. No. 5,428,403.

U.S. Pat. No. 5,764,787 proposes motion estimation by loading consecutive pixel values into fields of a register. Byte-based SIMD architecture and instructions can help speed up motion estimation.

U.S. Pat. No. 5,812,199 and U.S. Pat. No. 5,739,872 perform motion estimation by pixel subsampling and search area subsampling. This method does not take into account the bit rate requirement of the motion vectors, and should achieve poor complexity-quality trade off.

The disclosure of all of the above documents is incorporated herein by reference.

The present inventors have proposed an algorithm, circular zonal search (CZS), in which a search is first performed using a block at the centre of the image, searching for the reference image starting with blocks having a central pixel at the centre of the reference image. Specifically, a number of zones in the reference image are defined, as circular regions one pixel in radial extent and centred on the centre of the image. The search is performed for each of these zones in turn, working radially outwards, and in each zone comparing the blocks centred on the pixels of that zone with the block being coded. Instead of searching for the best possible matching image in the reference frame, the search terminates when the mismatch between a block of the reference frame and the block being coded is less than a threshold. This technique exploits the fact that most video sequences are centre biased, so the centre of the search area is most likely to be the optimal block. The remaining search points have decreasing likelihood to be optimal, according to how far they are away from the centre. A drawback of CZS is that the advantage of the algorithm over FS is low if the threshold is too low.

SUMMARY OF THE PRESENT INVENTION

The present invention seeks to provide new and useful techniques for video image compression.

A first aspect of the present invention ("half-stop" or "HS") proposes that in a search for a block of a second image (e.g. a reference image) which is similar to a block in a first image (e.g. an image to be coded), in the sense of having a low value of a mismatch parameter, if a given interval passes without finding a block having a mismatch value better than the best block of the second image previously found, the search is terminated, and the best block previously found is taken as the result of the search. In the case that the search is a search starting at a first point and continuing in zones (e.g. circular zones) outward from the first point, the interval may be defined in terms of the number of zones searched without locating a block having a lower value of the mismatch value than the best block found so far. This is based on a rationale that if no better motion vectors are found for a long time, the search using zones should stop "halfway" without going through the whole search area, taking the best block found so far.

In one possible mode, HS terminates immediately also in the case that a block is found to have a mismatch value (e.g. SAD) less than a certain threshold.

In another possible mode, HS does not terminate immediately in this case. Instead, it finishes computing the SAD of the all blocks based on pixels of the current zone, and then when the minimum mismatch value (e.g. SAD) is less than the threshold, it terminates.

A further possibility is for HS to employ more than one threshold, where the threshold may depend upon the central point around which the zones are defined. For example, the algorithm may employ a first threshold when the zones are defined around a central point which is (0,0) (i.e. a motion vector which indicates no motion) and a second threshold when the zones are defined around another central point.

As well as these thresholds for accepting of a pixel, the method may employ one of more further thresholds. For example, it is possible in a search around a given reference pixel to define a second threshold, higher than the first. If the best pixel found so far has a mismatch value above the first threshold but below the second, the pixel is not really "good enough" but it is "not too bad". The algorithm may in this case search a predetermined number of additional zones, and if no better point is found select the block of the second image as the one based on the "not too bad" pixel. Once again the values of such thresholds may depend upon the nature of the central point itself, e.g. whether it is the (0,0) position or not.

The present inventors refer to one form of a method according to the first aspect of the invention as a half-step circular zonal search (HSCSZ). As an alternative to defining the circular zones around the centre of the reference frame, HSCZS defined the centre of the zones as a predicted motion vector, derived as the median values between the motion vector of the previous block and the motion vectors of the block which is just above, or above and to the right, in the frame being coded. This improves efficiency, since in many standards, e.g. MPEG, motion vectors are encoded differentially, and thus there is an advantage if correlated motion vectors are used for adjacent blocks.

HSCZS typically manages to increase the performance of CZS by approximately 2–3 times for low motion sequences, and up to 5–7 times for faster sequences.

This concept of searching for a block of a second image (e.g. reference image) which has great similarity to a block of a first image, by successively testing blocks of the second image defined based on pixels of the second image, starting from one or more "reference" pixels of the second image which are selected using a combination of:

a previously-derived motion vector of a block in a third image (e.g. a predecessor or successor of the first image in a sequence of images) corresponding in location to the block of the first image, and a previously-derived motion vector for one or more adjacent blocks of the first image, constitutes an independent second aspect of the present invention.

Thus, the reference pixel(s) may be chosen as an average of (i) the motion vector of the third block and (ii) the motion vectors of a (respective) selected adjacent block or selected combination of adjacent blocks.

A third aspect of the invention "diamond zonal search" (DZS) proposes, in general terms that a search for a block in a second image (e.g. a reference frame) which is similar to a block in a first image (e.g. an image to be coded), is carried out based on positions which are in successive diamond-shaped zones (or approximately diamond-shaped zones) surrounding a reference pixel of the second image.

Specifically, in this third aspect, the present invention proposes a method of searching for a block of a second image (e.g. a reference image) based on an array of pixels, which is similar to a block of a first image based on the array of pixels, a similar block of a second image (e.g. a reference image) based on said array of pixels, the method including:

(i) defining a reference pixel of said array;

(ii) defining a plurality of search zones in said array, labelled by integer index i, each i-th zone being composed of pixels for which the sum of the absolute vertical position difference (y) in between that pixel and the reference pixel and the absolute horizontal position difference (x) between that pixel and the reference pixel is equal to i;

(iii) for successive zones, and for successive pixels in each zone, determining a block of the second image based on said pixel, and determining mismatch between said block of the first image and said determined block based on a mismatch criterion; and (iv) determining said similar block of the second image as the determined block for which said determined mismatch is lowest.

The zones defined by the first aspect are nested, and each of a "diamond" shape, being squares having four diagonal sides. The diamond shape is selected according to the bit definition patterns of the motion vectors in the MPEG-1, MPEG-2 and MPEG-4 standards. The diamond shape achieves significant saving in the bits for encoding of the motion vectors (since a motion vector of a given length, or distance from a predicted motion vector, is encoded in these standards in a number of bits which is lower according to how close the motion vector is to the horizontal or vertical direction). Furthermore, a method employing diamond shaped zones is much more regular for implementation than the circular shaped zones discussed above.

On the other hand, in instances in which the saving in encoding is considered more important than the regularity of the implementation, the scheme may be varied by, in step (ii), defining each i-th search zone in said array, labelled by integer index i, as diamond-like shapes in which the straight sides of the diamond are replaced by curves (e.g. hyperbola) flexing towards the reference pixel.

One suitable formula to describe such diamond shaped zones is $x^k+y^k=i$, where k is a predetermined parameter. Clearly, this formula reduces to the formula for diamond-shaped areas for the case k=1. If k=2, the formula gives circular zones. The close-to-diamond-like shapes correspond to a case in which k is between 0 and 1, such as k=0.75. The close-to-diamond shapes are motivated by the bit allocation pattern for the motion vector encoding of MPEG-1/2/4.

A further conceivable generalisation is the formula $ax^k + by^k = i$, where a and b are further predetermined parameters (positive numbers). In the case that k=2, a=b implies that the zones are circles, while if a is not equal to b the zones become elliptical. In the case that k=1, and a is not equal to b, the result is diamond-shaped zones with different horizontal and vertical extents.

As for the reference pixel, this may be a central pixel of the second image. Alternatively, it may be a pixel which is chosen based on an estimate of the motion vector (e.g. to be a predefined pixel of the block to be coded, displaced by the estimated motion vector). In fact, it is possible to combine these two approaches, by performing a method according to the first aspect of the invention twice: once using the central point of the second image and once using a point selected based on a predicted motion vector (e.g. using a different termination criterion in each case). The best matching blocks found in each case are compared, and the one for which the mismatch is lower would be used as the most similar block.

A fourth aspect of the invention "adaptive search areas" (ASA) proposes in general terms that a search for a block in a second image which is similar to a block in a first image, is carried out within a window of the reference frame which is determined in accordance with an adjustable parameter.

A fifth aspect of the invention ("radar search") proposes in general terms that a search for a block in a second image which is similar to a block in a first image, is carried out by first performing a first search for a point having a low mismatch (e.g. this may be by any of the algorithms discussed above), taking that point as a reference point, and performing a search in successively outer zones around the reference point (e.g. omitting blocks which have been examined before and found not to have minimal mismatch values). This scheme may be extended to multiple derived reference points ("multiple radar search").

A sixth aspect of the invention ("Advanced Criterion" or "AC") proposes in general terms that a search for a block in a second image which is similar to a block in a first image, is carried out in successively outer zones around a reference point, and if it is found that no point in the second zone has a match as good as that based on the reference point itself or on a point in the first zone, then that point which gives best match is used to define the best matching block. This is in fact a special case of the first aspect of the invention.

A seventh aspect of the invention ("multiple adjacent predicted MVs") proposes in general terms that a search for a block in a second frame which is similar to a block in a first image, is carried out, e.g. using a method according to any one of the preceding aspects, for each of a plurality of search regions including a respective motion vector prediction.

A eighth aspect of the invention ("adaptive thresholds") proposes in general terms that a search for a block in a second frame which is similar to a block in a first frame (e.g. an image to be coded), is carried out using one or more termination criteria based on respective thresholds, the thresholds being adjusted automatically. One possibility is for the thresholds for a given block to be adjusted based on the values of mismatch criteria of its neighbours. Alternatively or additionally, the thresholds may be based on a mismatched value of a previous reference frame (for example, the mismatch value of the block of the previous reference frame which was found to best match a block in the same location as the block in the first image).

An ninth aspect of the invention ("adaptive zone no") proposes in general terms that a search for a block in a second image (e.g. reference frame) which is similar to a block in an first image to be coded, is carried out using a series of nested zones surrounding a reference point, the maximum number of zones used in the search being selected based on at least one criterion.

A tenth aspect of the invention (here referred to as "midSAD", although another name is more appropriate if the matching criterion is other than SAD) proposes in general terms that a search for a block in a second image (reference frame) which is similar to a block in a first image to be coded, is performed by an algorithm which employs parameters derived from previous search for block(s) of the second image similar to adjacent block(s) of the first image. In other words, when successive blocks of a first image are matched to a second image, parameter values can be carried over.

The above aspects of the invention are freely combinable with each other, but also with existing techniques. For example, any aspects of the invention apart from the third (diamond-shaped zones) are applicable to zones which are circular.

Definitions

The expressions of the invention given above are in terms of images with the particular example of a sequence of images (i.e. in total a 3-D signal). However, the present invention in any of its aspects is applicable to any process to establish correspondence between portions ("blocks") of a 3 dimensional signal (e.g. blocks of pixels within a time-evolving 2D picture in a video signal) and portions ("blocks") of another "reference" signal (e.g. blocks of pixels in a time-evolving picture of the reconstructed video). The 3D signal may be pre-processed, i.e. before motion estimation by any method according to the invention is applied. Once a suitable block of the second image is found, the correspondence between the respective blocks of the first and second images is described by a vector which reflects the relative location of the matching portions, and referred to here as a "matching vector".

The blocks can be of any shape (e.g. square or rectangular), possibly subsampled and possibly with reduced spatial or bit resolution. One picture element may have one or more components such as the red, green, blue (RGB) components, the YUV components, the YcrCb components, the infrared components or other components. Each component of a picture element is a number, which may be a natural number, an integer, a real number or even a complex number. In the case of natural numbers, they may be 12-bit, 8-bit, or any other bit resolution. The blocks may or may not be overlapping.

The blocks in the case of MPEG-1, MPEG-2, MPEG-4, H. 261, H. 263, H.263+ are rectangular with a size of 16×16, 16×8, 8×16 or 8×8. The corresponding motion vectors are 2D displacement vectors between the nearby pictures (i.e. in a stream of pictures).

A search region may be defined in the reference 3D signal, which may be defined on a rectangular, hexagonal or other shaped grid. The search region may be different for different blocks. The search region may be 1D, 2D, 3D in nature. It may be rectangular, or of any other shape. The search region may be subsampled, regularly or irregularly. All candidate matching blocks must come from the search area. The location within the search region which corresponds to null motion is called the origin. The location within the search region that contains the "predicted" motion (or the probable motion) is called a predicted motion vector. The predicted motion vector may be one of the neighbouring motion vectors, or a function (e.g. median) of any combination of them.

A zone is a collection of search points within the search area. Different zones may contain different numbers of search points. Usually the search points within a zone are contiguous but they do not have to be. A zone may be circular, rectangular, diamond in shape or possibly hollow. The zones can be numbered. For example, in the case of a 2D rectangular search area, zone 0 around the origin may be the origin itself. Zone 0 in relation to any other point of the reference frame is defined in a corresponding way as that reference point itself.

In a method according to any aspect of the invention which employs zones labelled by an integer i, we will use the numbering convention that i=1 is the reference pixel itself, although it would be equivalent to refer to number the zones such that the reference pixel is i=0.

Although the values of i may be consecutive integers (e.g. i=1,2,3,4), this is not a necessary feature of the invention. For example, any method may be employed twice, first based on a first reference pixel and using values of i which rise but not consecutively (e.g. i=2,4,6, . . . ) to find an improved reference pixel, and a second time based on that improved reference pixel and taking consecutive values of i of (e.g. i=1,2,3,4, . . . ) to label zones around the improved reference pixel. Thus, the first application of the present invention provides a low resolution search, and the second application a higher resolution search.

Furthermore, it is not necessary that in step (iii) that a block is determined for every pixel of every zone.

The method may employ a termination criterion such that step (iii) terminates (e.g. after finishing any of the zones, or indeed after some but not all of the pixels of a given zone) if said termination criterion is met Specifically, the method may employ a termination criterion, and block comparison based on pixels in a zone may be performed for successive zones, and for successive pixels of each zone, until said termination criterion is met.

Additionally or alternatively, the blocks of the second image may be generated based only upon a sample of respective pixels in a given zone.

Explanation of Some Optional Features of the Invention

For the sake of illustration, we will now give an example of an algorithm incorporating the features of the first, third, fifth, and sixth aspects of the invention. A more preferred, but more complex, algorithm ("APDZS") incorporating also the second, fourth, seventh, eighth, ninth and tenth aspects of the invention is described in detail later.

In the search N1 zones around the predicted motion vector are examined one diamond-shaped zone at a time starting with the innermost zones (firstly zone i=1, the reference pixel itself). Within a zone, the distortion measure (mismatch measure) such as the sum of absolute differences (SAD), mean absolute difference (MAD), sum of square difference (SSD), mean square difference (MSE), cross correlation (COR) or any other measure, is computed for search points.

In a first form of the algorithm, at the end of each zone, the search point with the least distortion up to that point is identified. If the distortion is smaller than a threshold T1 at any search point, the search terminates and the search point at which the distortion is smaller than T1 is declared the best match. In a second form of the algorithm, this termination may occur immediately if any point is found in the zone for which the mismatch is smaller than T1, without examining the remaining points of the zone.

If the minimum distortion of the points in the zone is greater than or equal to T1 but is smaller than a larger threshold T2 (T2>T1), at most N2 additional zones will be examined. Within the N2 additional zones, if the distortion is smaller than T3 at a certain search point, the search terminates immediately and that search point is declared the best match as before. If the distortion is larger than or equal to T3 in the N2 additional zones, the search point examined up to that point with the least distortion (mismatch) is declared the best. If all search points within the N1 zones around the predicted motion vector have distortion greater than or equal to T2, all the N1 zones will be examined.

Also a special situation may terminate the search early. When the innermost N3 zones are examined and the search point with least distortion occurs in the innermost N3–N4 zones (N4<N3) the search terminates and that best search point with least distortion is declared the best match.

Another situation which may terminate the search early if the best search point hitherto identified remains unchanged for a consecutive N5 zones (i.e. if no search points with smaller distortion is found within the next N5-1 zones).

If the search does not terminate in these ways N6 zones around the origin (or other reference point) are examined one zone at a time starting with the innermost zones. Part of the zones may overlap with the N1 zones defined above. Within a zone, the distortion is computed for the search points that do not overlap with the N1 zones.

In a first form of the algorithm, at the end of each zone, the search point with the least distortion up to that point is identified. If the distortion is smaller than a threshold T4 at any search point, the search terminates and the search point at which the distortion is smaller than T4 is declared the best match. In a second form of the algorithm, this termination may occur immediately if any point is found in the zone for which the mismatch is smaller than T4, without examining the remaining points of the zone.

In either case, if the minimum distortion is greater than or equal to T4, but is smaller than a larger threshold T5 (T5>T4), at most N7 additional zones will be examined. Within the N7 additional zones, if the distortion is smaller than T6 at a search point, the search terminates immediately and that search point is declared the best match as before. If the distortion is larger than or equal to T6 in the N7 additional zones, the search point examined up to that point with least distortion is declared the best. If all search points within the N6 zones around the origin have distortion greater than or equal to T5, all the N6 zones will be examined.

A special situation would terminate the search early also. When the innermost N8 zones are examined and the search point with least distortion occurs in the innermost N8–N9 (N9<N8), the search terminates and that best search point with least distortion is declared the best match.

Another situation would terminate the search early. Recall that at the end of each zone, the search point with the least distortion up to that zone is identified. If any such search point remains unchanged for a consecutive N10 zones (i.e. no search points with smaller distortion are found within the next N10-1 zones) the search terminates and that search point is declared the best match.

If the search does not terminate in this case, the best search point up to this point with least distortion is identified. A local search is performed around this point by defining N11 zones around the point ("radar search"). The N11 zones are examined one zone at a time starting with the innermost zones. Part of the zones may overlap with the N1 zones defined above, and the N6 zones defined above. Within a zone, the distortion is computed for the search points that do not overlap with the N1 zones or the N6 zones.

In a first form of the algorithm, at the end of each zone, the search point with the least distortion up to that point is identified. If the distortion is smaller than a threshold T7 at any search point, the search terminates and the search point at which the distortion is smaller than T7 is declared the best match. In a second form of the algorithm, this termination may occur immediately if any point is found in the zone for which the mismatch is smaller than T7, without examining the remaining points of the zone.

In either case, if the distortion is greater than or equal to T7 but is smaller than a larger threshold T8 (with T8>T7) at most N12 additional zones will be examined. Within the N12 additional zones, if the distortion is smaller than T9 at a search point, the search terminates immediately and that search point is declared the best match as before. If the distortion is larger than or equal to T9 in the N12 additional zones, the search point examined up to that point with least distortion is declared to be the best. If all search points within the N10-1 zones around the origin have distortion greater than or equal to T8, all the N11 zones will be examined. The search will terminate after all the N11 zones are examined by declaring that search point examined up to that point with least distortion to be the best match.

A special situation would terminate the search early also. When the innermost N13 zones are examined and the search point with least distortion occurs in the innermost N13–N14 (N14<N13), the search terminates and that best search point with least distortion is declared the best match.

Another situation would terminate the search early. Recall that at the end of each zone, the search point with the least distortion up to that zone is identified. If any such search point remains unchanged for a consecutive N15 zones (i.e. no search points with smaller distortion are found within the next N15-1 zones) the search terminates and that search point is declared the best match.

BRIEF DESCRIPTION OF THE FIGURES

Embodiments of the invention will now be described for the sake of example only with reference to the following figures, in which.

DETAILED DESCRIPTION OF EMBODIMENTS
DZS and HSDZS

Figure 1:
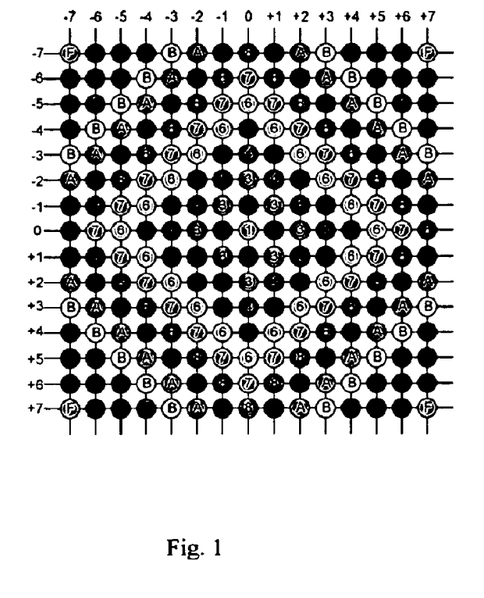
FIG. 1 illustrates a definition of Diamond shaped zones in a 15×15 search window, for use in a first embodiment of the invention.
Figure 2:
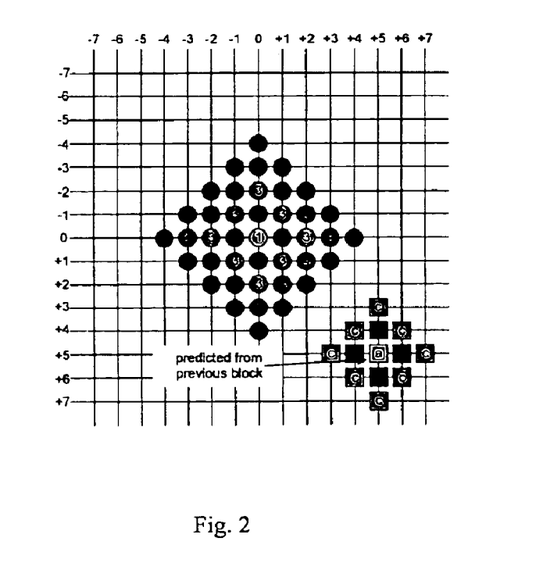
FIG. 2 shows, in the embodiment of FIG. 1, the diamond shaped zones after considering the predicted MV.

FIG. 1 illustrates a definition of diamond zones in areas surrounding a reference point 1. The value of i for the points of each zone are indicated; the points of a given zone have the same index value. Employing the search using a diamond pattern is much closer to the way motion vectors are encoded than the circular case. It is important to note that if the "best" match is found in zone 4 for the case of DZS this would mean checking 25 points where, as in the case of CZS, it would have probably been necessary to examine 37 points instead. This is a reduction of approximately 50%. As in the case of CZS, if we also consider the predicted motion vector taken as the motion vector of the adjacent block, the search is performed as can be seen in FIG. 2.

Since though the prediction might totally be unrelated to the true motion, like in the case of edge blocks where one object might be moving towards one direction, and the other might be the stationary background, we introduce one more criterion in the search after examining the predicted block. If the predicted block is relatively bad, afterwards in an in between step, also compare the center of the search area, and examine whether this location yields a much better result. If this result satisfies some thresholding criterion, then most likely this block is a background block, and thus we can stop the search. If it does not satisfy the thresholding criterion, but is much better than the predicted block, then we skip the other zones around the predicted block, and continue the search around the center of the search area. Otherwise continue with examining the zones as defined in FIG. 2. This additional criterion, even though in some cases can increase the computational cost slightly, in others can greatly reduce it since it will not be necessary to examine all the search locations around a prediction. This has also been found to help in finding the true motion of a block.

Algorithm for HSDZS:

Since the algorithm HSDZS is more general and DZS is basically a subset of this algorithm (zonal criterion=∞) we will only present the HSCZS algorithm. The motion vector MV of the current block is estimated as follows:

Step 1: If the current block is the leftmost block, set MVpredicted to be (0,0). Otherwise, set MVpredicted to be the motion vector of the adjacent block. If MVpredicted=(0,0), go to step 6. Set MinZone=−1.
(Diamond Zonal Search Around Predicted Motion Vector)
Step 2: Construct M diamond shaped zones around MVpredicted in the search window. Set i=1.
(Thresholding Criterion)
Step 3: If (i−MinZone)>TZ1 goto step 12.
Step 4: Compute MAD for each search point in zone i. Let MinMAD be the smallest MAD up to this point. Let MinZone be the zone where the smallest MAD has been found up to now.
Step 5a: If MinMAD<T1 goto step 12. Else if i<M, set i=i+1. If i=1 and MinMAD>2*T1 goto step 5b else goto step 3.
Step 5b: Let ZeroMad be the MAD at position (0,0). If ZeroMAD<512 & ZeroMAD<MinMAD & ZeroMAD<T1 set MinMAD=ZeroMAD and goto step 12. Else if ZeroMAD<2*MinMAD goto step 6. Else goto step 3.
(Diamond Zonal Search Around (0,0))
Step 6: Construct N diamond shaped zones around (0,0) in the search window. Set i=1. Set LAST=False, MinZone=−1.
(Thresholding Criterion)
Step 7: If (i−MinZone)>TZ2 goto step 12.
Step 8: Compute MAD for each search point in zone i. Let MinMAD be the smallest MAD up to this point. Let MinZone be the zone where the smallest MAD has been found up to now.
Step 9: If MinMAD<T2 or LAST=true, goto step 12.
Step 10: If T2<MinMAD<T3, set LAST=true.
Step 11: If i<N, set i=i+1. Go to step 7.
(Final Step. Use Best MV Found.)
Step 12: The motion vector is chosen according to the block corresponding to MinMAD. This can be optionally refined by performing a local half-pixel or quarter-pixel search.

Here T1, T2, T3 and TZ1, TZ2 are some predefined thresholds, and M is usually smaller than N.

The proposed DZS/HSDZS was simulated on an MPEG-1 simulator, using an effective search area of 15×15 and 29×29 for the B frames and 43×43 for the P frames. We defined 8 diamond shaped zones for all types of frames around the predicted MV, and selected TZ1=TZ2 to be equal to 4 and 6 for the B and P frames respectively. Simulation was performed using the "Miss America" sequence in CIF format (a video conferencing sequence), and "Tennis" (SIF format). For Miss America, the new algorithm has similar visual performance as the CZS/HSCZS algorithms, but significantly improves on algorithmic complexity by approximately 50%. In the case even of non-video conferencing sequences such as "Tennis" the algorithm achieves a rather modest speed-up of 15 with an insignificant loss of 0.12 dB. This is a significant improvement considering that the best case scenario for HSCZS was 13 times speed up at a loss of 0.2 dB. As in CZS/HSCZS, the gain in PSNR is possible because the motion vectors of adjacent blocks are closer to each other and, since they are differentially encoded, fewer bits are needed to code the motion vectors leaving more bits to code the residue. The same conclusions for CZS/HSCZS, still hold for the new algorithm. This is true since the only real difference is the pattern of the zones used. For example, the algorithm can again perform even better in lower bit-rates, due to the reduced overhead required from the motion vectors, which greatly affects lower bit-rates. Also note that this pattern is much more regular than CZS which makes it easier for implementing the algorithm, especially in the case of a hardware device.

We have also successfully tested these algorithms using an MPEG-4 simulator.

In summary, the proposed Diamond Zonal Search (DZS) algorithm and its variations have the following characteristics:

1. it can achieve various speedup and quality tradeoffs by adjusting the thresholds
2. a small gain in PSNR is possible at lower and in some cases higher speedup factors
3. the loss in PSNR at higher speedup factors is negligibly small
4. it performs better in lower bit rates, which are the bit rates of interest for video conferencing
5. it can perform modestly fast motion estimation for even non video conferencing sequences without much degradation in quality
6. the algorithm is rather simple and very regular, which allows it to be implemented easily in hardware.

Figure 3A:
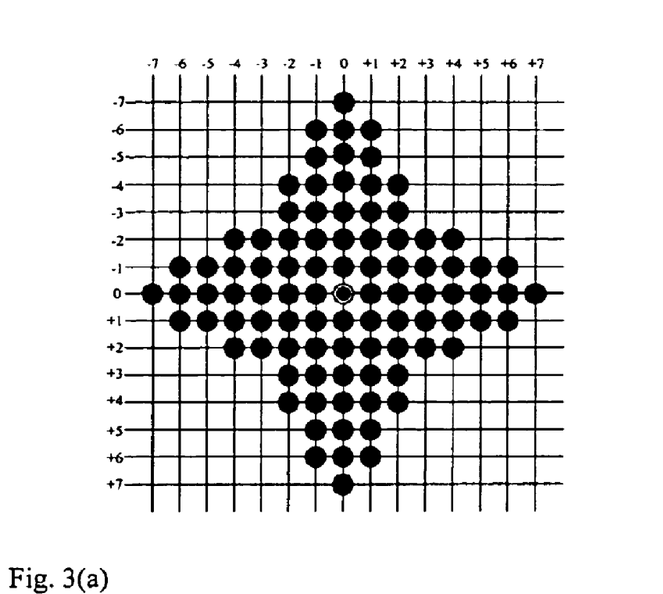
FIG. 3(a) and 3(b) respectively show zones in a close-to-diamond zone arrangement, and the length of the signal required within the MPEG standards to encode various motion vectors.
Figure 3B:
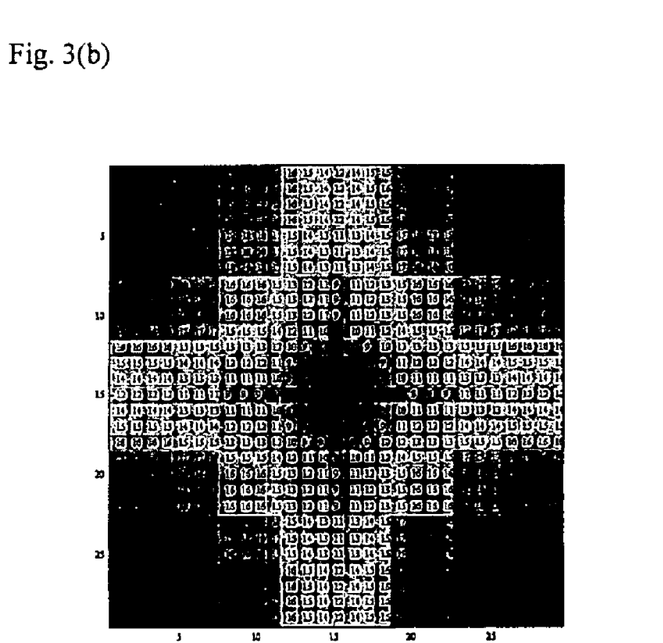

FIG. 3(a) shows a variation on the diamond search zones, in which the search zones have a close-to-diamond shape, each edge flexing inwardly towards the centre of the zone (successive nested search zones are alternately coloured white and black). This close-to-diamond shape is motivated by consideration of FIG. 3(b), which shows the information required for motion vector encoding in MPEG-1/2/4. The central (darkest) area shows motion vectors which can be encoded with the shortest signal, surrounded by an area (light grey) of motion vectors which require slightly more signal to be encoded, and, at the corners of FIG. 3(b), in dark grey motion vectors which require a yet longer signal to be encoded.

Adaptive Search Areas

Figure 4:
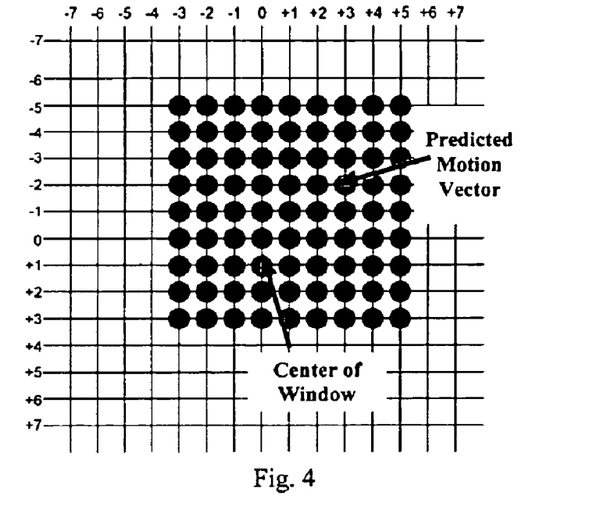
FIG. 4 shows an adaptive search window with a=3 for use in a further embodiment of the invention.

Since adjacent blocks usually have motion vectors close to their prediction, in order to further increase the efficiency of the algorithm in terms of speed up, the algorithm was modified even further by introducing the Adaptive Search Area concept. We first define the adaptive area parameter a. Instead of having to examine the entire search window, it is only necessary to examine a reduced search window. This window ranges from a point in the exactly opposite quadrant than the prediction, with vertical and horizontal distance from the center equal to a, up to a point in the same quadrant as the prediction, but now with vertical and horizontal distance from the prediction to be equal to a. For example, if the prediction is equal to (+2,+2) and a=3 then the new search window for the current block will be reduced to a window starting from (−3,−3) up to (+5,+5) as can be seen in FIG. 4. Note that the value of a can be adjusted, e.g. from one block to another adjacent one, for example in dependence upon how far the pixel of the second image which gives the best match with the preceding block is from the centre point (0,0).

Embedded Radar (ER)

Figure 5:
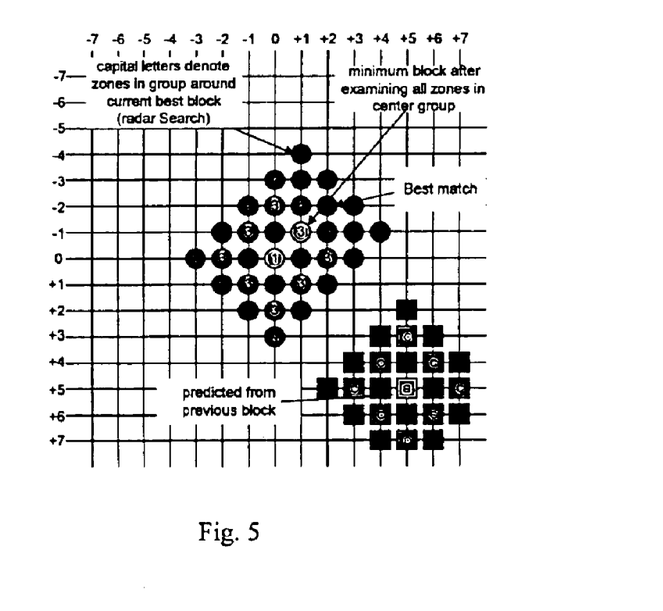
FIG. 5 shows a definition of DZS-ER zones used in a further embodiment of the invention.

One way of improving the embodiments of the invention described above is to perform a similar shaped local search around the final best position, after a finite number of zones around both the prediction and the center have been examined. The algorithm is referred to here as Radar Zonal Search (RZS), and is combinable with the Half-Stop criterion. RZS allows us to reduce the search area around the predicted motion vector and the center, and thus reducing the searching points, without incurring much loss in quality. The combination of Diamond Zonal Search and Radar Zonal Search we name Diamond Zonal Search with Embedded Radar (DZS-ER) and an example of its implementation can be seen in FIG. 5.

Figure 6:
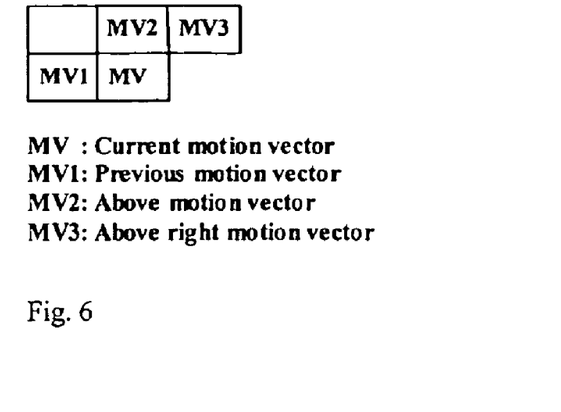
FIG. 6 shows the coding of Macroblock Motion vectors in MPEG-4.

A predicted motion vector is used in DZS-ER. The predicted motion vector is taken as the median values between the previous and the above/above-right motion vectors as shown in FIG. 6. This is due to the consideration that motion vectors are differentially encoded according to the same scheme.

The above scheme can be generalised to give "multiple radar search" in which a plurality of pixels, each relating to a block having a comparatively low value for the matching criterion, can each be used as the centre of a zonal search.

All the above algorithms have the additional flexibility to be able to select the number of zones designed around the prediction and/or center, and also to adjust the thresholds and the Half-Stop criterion for different applications. In DZS-ER it is also possible to disable/enable the Radar type search. From extensive simulations it was possible to design default parameters, which could be used under any conditions.

The proposed algorithm was embedded in the MPEG-4 VM encoder software and was tested using the test conditions proposed by the MPEG Adhoc Committee on Encoding Optimisation, which were created for evaluating the algorithms' performance under various conditions. We have compared our results versus Full Search and the Diamond Search Algorithm (DS).

For the simulation, a Pentium II processor with 384 MB of memory running Linux at 450 MHz was used. The configuration was selected such as to reduce the memory/hard-disk swapping of the system. No other process was allowed to run on the system except the standard system processes (system utilization was between 97–100% for all simulations).

From the simulation results, our algorithm DZS-ER outperforms FS in the high bit rate cases with both significantly higher speedup and slightly better PSNR. In the class A sequences (Class A video sequences conventionally used by MPEG to evaluate performance of various video coding algorithms) at low bit rate, DZS-ER achieves high speedup compared to FS while achieving similar PSNR. For this comparison, the same set of default values of DZS-ER for the number of zones, Half-Stop criterion and the thresholding parameters are being used.

One advantage of the DZS-ER algorithm is the potential to refine its performance by modifying different parameters (different thresholds or half stop criterion, number of zones and radar search).

The Radar criterion can be considered as a local search technique, which tries to optimize our result in case all previous criteria have failed. It was found that this criterion allows the creation of fewer number of zones around the prediction and center, and thus increased speed up ratio, where as the algorithm does not suffer much in PSNR performance versus the Full Search algorithm. Note that the radar criterion can be applied repeatedly, as mentioned above.

Advanced Criterion

Figure 7:
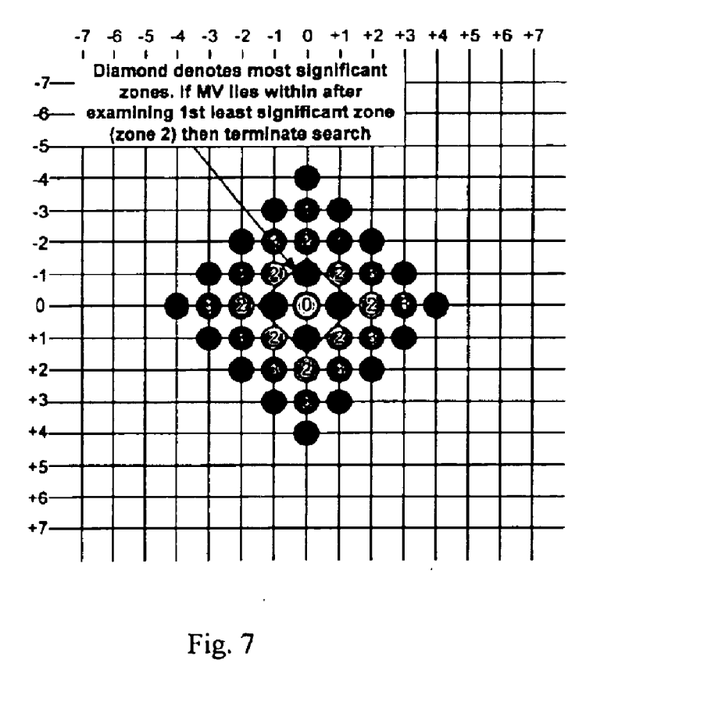
FIG. 7 illustrates an advanced diamond zonal search performed by an embodiment of the invention.

As a further improvement within the scope of the invention, a new criterion is introduced, which, according to experimental results, manages to enhance algorithmic performance further. By considering that the innermost zones usually have a higher probability of containing the actual Motion Vector solution, we modify our algorithm to give a higher priority to zones i=1 and i=2 around our current center (i.e. the prediction or (0,0)). After examining these two zones, if the 3rd zone is examined as well but the best motion vector, up to this point, lies within zones 1 and 2, it is very likely that this motion vector could actually be the best motion vector, or at least a very good candidate. Thus we may terminate instead of continuing our search and select the current best match as our Motion Vector. It could be said that this idea is a special case of the Half stop criterion, with different parameters used for the two innermost zones (2 for the 1st and 1 for the 2nd zone). It is rather obvious that the new criterion can work in conjunction with the previously discussed criterions. The partitioning of the zones in this manner, when using DZS is named Advanced Diamond Zonal Search (ADZS), and is illustrated in FIG. 7.

The proposed algorithm was embedded in the MPEG-4 VM encoder software and was tested using the test conditions proposed by the Adhoc Committee on Encoding Optimization, which were created for evaluating the algorithms' performance under various conditions. We have compared our results versus Full Search and the Diamond Search Algorithm (DS).

APDZS

Unlike the previous versions of our algorithm, APDZS considers up to 5 initial prediction points instead of just one, such as the motion vectors of the left, top, top-right blocks from the current position, their median and the motion vector of the co-located block in the previous frame. Others could also be considered as well, such as the (0,0) motion vector, the motion vector of the top-left block and the mean of the previous mentioned blocks. Note that it is very likely that some of these motion vectors are the same, and thus could be that less than 5 locations are initially examined.

Initially, the APDZS algorithm examines only a single prediction point (e.g. the median position as defined above) and an initial threshold (e.g. 256 in the case of SAD, but it could vary especially if other distortion measures are to be used) is used to determine whether the algorithm requires further prediction points.

After calculation of the motion estimation for all 5 positions, the smallest one is taken and Diamond shaped zones are created in similar fashion to the DZS algorithm described above.

The Half-top Criterion enhances greatly the speed up performance of our algorithm by considering the probability of occurrence of a better match after a number of zones have been examined following our current best match. Note that due to the increased confidence of the prediction, the Half-Stop criterion can now be reduced significantly. Values set in the algorithm are preferably 1 for the zones created around the prediction (if median is different than (0,0)), and 2 for all other cases.

Figure 8:
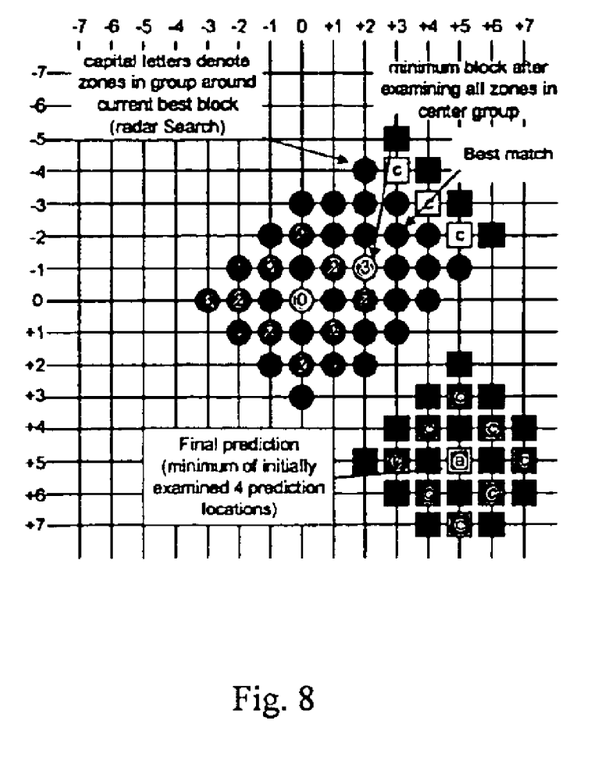
FIG. 8 illustrates a further embodiment of the invention.

The APDZS algorithm also employs the Radar criterion, as shown in FIG. 8. It should be noted that Radar-Search areas do not need to be restricted to just one. For example, four (4) such areas may be created. APDZS further employs the advanced diamond zonal search explained above in relation to FIG. 7.

In this algorithm an adaptive technique for threshold calculation is also introduced. In a similar argument to the motion vector initial prediction, since adjacent blocks are usually highly correlated, it is also expected that the final value of the minimum SAD to be very close to each other. Thus, instead of using a fixed threshold value, thresholds are actually calculated depending on the minimum SAD values of their adjacent blocks (left, top and top-right). In our algorithm the minimum value of the three above blocks is selected for T1. Other blocks such as the top-left could also be included in the calculation. T2 is taken as T1+256. We have set an actual limit (both lower and upper limit) for these two values to ensure performance. The lower and upper limit for T1 was set to 512 and 1024 respectively; where as the upper limit for T2 was set to 1792 (no-lower limit). Limits could also vary or even disabled.

In our algorithm, the thresholds T1 and T2 are adaptively determined. T1 may be a function of a fixed number F1 and a variable number V1 which depends on some "neighbouring" blocks. One possible function is the weighted average, $T1=W1*V1+W2*F1$ for some weights W1, W2. Another possible function is $T1=V1^{W1}+F1\ W$, for some W1 and W2. The variable number V1 is a function of the mismatch measure of the three blocks above, the left block, and potentially other spatially neighbouring block(s), the co-located block in the reference frame (or frames) and its neighbouring block(s). The function may be the average, the minimum, the maximum, median, trimmed mean, etc. The T1 is further upper bounded and lower bounded by some fixed numbers F2 and F3. These are equivalent to clipping T1. For the weighted average, if W1 is one and W2 is zero, the threshold is the variable number V1. If W1 is zero and W2 is one, the threshold is the fixed threshold. T1 may also depend, in addition, on the quantization factors, target quality or target bit rate. T1 may also depend on the zone number 1 and the zone type.

In a similar way, T2 is the sum of T1 and a function of a fixed number F2 and a variable number V2 which depends on any one of more of the "neighbouring blocks", the quantization factors, the target bit rate, the target quality, the zone number and the zone type. For example, a fixed number F2 can be 256 or 512 if SAD is used. And T2 is also clipped (or upper and lower bounded).

By setting both T1 and T2 to zero, thresholds can actually be disabled, if necessary.

All of the above features apply not only to T1 and T2, but to T3, T4, etc.

In a final consideration if all the adjacent motion vectors are the same, or the median prediction is the same as the motion vector in the previous frame, this gives us a high confidence in terms of the motion vector and fewer zones may be examined (e.g. N1=3). Even better, if both are true at the same time, confidence becomes stronger and we may examine an even smaller number of zones (e.g. N1=2), and even set a flag that terminates the algorithm after examining these zones without caring if other criteria later described are satisfied. Note that for the later case, confidence is so strong that for some applications we could even decide on not performing motion estimation and immediately selecting the prediction as the final motion vector.

As mentioned above, a preferable feature of the invention is that the value of the mismatch parameter (e.g. SAD) in the collocated block of a previous frame (that is a previously-coded frame) is used to influence the algorithm. In one embodiment, if after examining all predictors, the motion vector that corresponds to the minimum SAD is the same as the MV of the collocated block in the previous frame, then the SAD is also compared to the SAD value of the collocated block in the previous frame (a similar concept to the thresholds used previously). If it is smaller, then the algorithm may immediately terminate. Note that the SAD value of the collocated block in the previous frame could also be weighted with a parameter W3 (either reducing or enhancing the significance of this termination criterion).

There follows a possible algorithm for the proposed Advanced Predictive Diamond Zonal Search (APDZS) for estimating the motion vector MV of the current block. Note that a block B is considered to belong in diamond shaped zone i if abs(Bx)+abs(By)=i, where Bx and By correspond to the position of Block B. The variables thresa, thresb, zsize, znum, and pznum are all integer values which specify the parameters of the algorithm (i.e, thresholding criteria, Half-Stop criterion, number of zones etc.)

Step 1: Set thresholding parameters (thresa & thresb). These are set as follows:
If first row and column, thresa=512, thresb=1024
Else thresa=minimum value of the sad of left, top and top-right blocks thresb=thresa+256;
If thresa<512, thresa=512. If thresa>1024, thresa=1024.
If thresb>1792, thresb=1792.
Set Half-Stop criterion (zsize), and number of zones around center and prediction (znum & pznum).
Set Found=0, Last=False and MinZone=0.
  Compute the predicted MV according to the Median rule.
  Select previous MV, above, and above-right and calculate median.
  If block is an edge block, depending to the position, do the following:
  If block is on the first column, assume previous MV to be equal to (0,0).
  If block is on the first row, select previous MV as the prediction.
  If block is on the last column, assume above right MV to be equal to (0,0).
(Initial Prediction Calculation)
Step 2: If left MV=top MV=top-right MV or MVpredicted= Previous Frame MV, set pznum for current block to 2.
If left MV=top MV=top-right MV and MVpredicted= Previous Frame MV, set pznum for current block to 1 and Found=1
Step 3: Calculate SAD around the prediction. MinSAD= SAD
If Motion Vector equal to Previous frame motion vector and MinSAD<PrevFnmSAD goto Step 30.
If SAD<=256 goto Step 30.
Step 4: Calculate SAD for motion vectors taken from left block, top, top-right, and Previous frame block.
Let MinSAD be the smallest SAD up to this point.
Let MinZone be equal to 0.
Step 5: If MinSAD<=thresa goto Step 30.
If Motion Vector equal to Previous frame motion vector and MinSAD<PrevFormSAD goto Step 30.
Step 6: If thresa<MinSAD<=thresb, set LAST=true.
(DZS Around Predicted Motion Vector)
Step 7: Construct pznum diamond shaped zones around current minimum in the search window. Set i=1.
(Thresholding Criterion)
Step 8: If (i−MinZone)>zsize goto Step 30.
Step 9: Compute SAD for each search point in zone i.
Let MinSAD be the smallest SAD up to this point.
Let MinZone be the zone where the smallest SAD has been found up to now.
Step 10: If (i=2) and (Minzone!=2) goto Step 30. {New criterion}
Step 11: If MinSAD<=thresa or LAST=true, goto Step 30.
Step 12: If thresa<MinSAD<=thresb, set LAST=true.
Step 13: If i<pznum, set i=i+1 and goto Step 8.
(DZS Around (0,0))
Step 14: If LAST=true or found=1 goto Step 30.
Else construct znum diamond shaped zones around (0,0) in the search window.
Set i=0, MinZone=−2.
(Thresholding Criterion)
Step 15: If (i−MinZone)>zsize goto Step 30.
Step 16: Compute SAD for each search point in zone i.
Let MinSAD be the smallest SAD up to this point.
Let MinZone be the zone where the smallest SAD has been found up to now.
Step 17: If (i=2) and (Minzone!=2) goto Step 30. (New criterion}
Step 18: If MinSAD<=thresa or LAST=true, goto Step 30.
Step 19: If thresa<MinSAD<=thresb, set LAST=true.
Step 20: If i<znum, set i=i+1 and goto Step 15.
(DZS Around Best Location−Embedded Radar)
Step 21: Set N=0.
Step 22: If LAST=true goto Step 30.
Construct 4 diamond shaped zones around the best location found until now.
Note that if location is previously examined, then it is not necessary to examine it again.
Set i=1, MinZone=−1.
(Thresholding Criterion)
Step 23: If (i−MinZone)>zsize goto Step 30.
Step 24: Compute SAD for each search point in zone i.
Let MinSAD be the smallest SAD up to this point.
Let MinZone be the zone where the smallest SAD has been found up to now.
Step 25: If (i=2) and (Minzone!=2) goto Step 30. {New criterion}
Step 26: If MinSAD<thresa or LAST=true, goto Step 30.
Step 27: If thresa<MinSAD<thresb, set LAST=true.
Step 28: If i<4, set i=i+1 and goto Step 23. Else N=N+1.
Step 29: If N<4 goto Step 22.
(Final Step. Use Best MV Found.)
Step 30: The motion vector is chosen according to the block corresponding to MinSAD.
By performing an optional local half-pixel (or quarter-pixel) search, we can refine this result even further.

We will now discuss the advantages of the above APDZS algorithm.

Motion vectors of adjacent blocks are usually highly correlated. Any given motion estimation algorithm would have a higher chance of finding the actual true motion vector when considering initially motion vectors taken from adjacent blocks. In addition, in standards such as MPEG-1/2/4 and H261-3, motion vectors are coded according to a predicted motion vector taken either to be the motion vector from the block to the left (MPEG-½) or the median of three neighbouring motion vectors (MPEG-4, H. 263). This is very important since it can significantly affect coding and performance. Finally, a block is also highly correlated with the block at the same position in the previous frame.

Considering the above, APDZS first examines the predicted motion vector (median) and calculates its SAD value. If this value is lower than a threshold, then it is already a very good match and the algorithm terminates. If not, some "adjacent" motion vectors are examined (the spatially adjacent motion vectors, the median prediction as in MPEG-4, and the temporally "adjacent" motion vector in the previous frame) and the one which yields the lowest SAD is taken as our current reference point.

Diamond-shaped zones are defined around this reference point. We define N1 diamond shaped zones (N1 is a parameter, e.g. N1=4) as shown in FIG. 8. Starting with a default value (e.g. N1=4), the zone number N1 is changed adaptively. If all the adjacent motion vectors are the same, or the median prediction is the same as the motion vector in the previous frame, the current reference point is more reliable than usual and thus fewer zones (smaller N1, e.g. N1=3) are examined. Moreover, if both are true at the same time, the current reference point is even more reliable and we may examine an even smaller number of zones (e.g. N1=2), and even set a flag that terminates the algorithm after examining these zones without caring if other criteria later described are satisfied. Note that for the later case, reliability can be so strong that for some applications we would not compute any SAD and immediately select the prediction as the final motion vector.

In FIGS. 7 and 8, all locations with the same number i comprise the zone i. For the sake of example, FIGS. 7 and 8 adopt a numbering convention in which the reference point is i=0. There is only one search location (or checking point) in zone 0, four in zone 1, eight in zone 2 and so on. The zones with smaller numbers have few points in general. In APDZS, we examine one zone after another and look for signs for a "good enough" match. If the SAD after examining a particular zone is less than a threshold T1, the search stops and that checking point is good enough and will be declared as the best match. If the SAD is between T1 and another threshold T2, (T2>T1), then the current match is not good enough but is at least fairly good. We will thus check for another N2 zones (e.g. N2=1) and choose the location with smallest SAD. If the SAD is greater than T2, the current match is bad and the search continues.

The thresholds T1 and T2 are changed adaptively. Using an argument similar to the high correlation of motion vectors of adjacent blocks, it is expected that the final value of the minimum SAD to be close to each other. Thus, instead of using a fixed threshold value T1 for every macroblock, the threshold T1 is APDZS is calculated based on the minimum SAD of their adjacent blocks (left, top, and top-right). In our algorithm the minimum SAD of their adjacent blocks is selected for T1. Other blocks such as the top-left could also be included in the calculation. The other threshold T2 is taken as T1+offset (e.g. offset=256). We have set an actual limit (both lower and upper limit) for these two values to ensure performance. The lower and upper limits for T1 were set to be 512 and 1024 respectively; whereas the upper limit for T2 was set to 1792 with no lower limit. Limits could also vary or even be disabled.

If no good enough checking point is found in the zones around the predicted motion vector, N3 additional diamond-shaped zones (e.g. N3=4) are defined around the origin. Again, starting from the inner zones, one zone is examined at a time in search of a good enough checking point using similar criteria as before.

If no good enough checking point is found in the N3 zones, the location of the best motion vector up to that point is noted. Some N4 (e.g. N4=4) additional diamond shaped zones are defined around this best MV and are searched one zone at a time to find a good enough checking point. This process may be repeated several times (e.g. 4 times) always selecting the best motion vector in each area as the new center. If still no good enough motion vector is found, the best motion vector up to that point will be declared the best match.

There are two other early termination conditions. If the best motion vector lies within zones 0 or 1, after examining zones 0, 1 and 2, then the search terminates. If the best motion vector does not change location after a number of zones, it is considered as a good local minimum and will be good enough to be declared the best motion vector.

In other words, there is a predefined searching pattern which does not examine the whole search area. Instead, APDZS examines a number of prediction points, selects the best one, and then searches a few zones around this reference motion vector, if necessary a few zones around the origin, and if again needed, in several steps, zones are designed around the best motion vector in each step and also examined. APDZS achieves computation reduction by checking for the earliest possible sign of "good enough" motion vector, or early termination opportunities.

Figure 9:
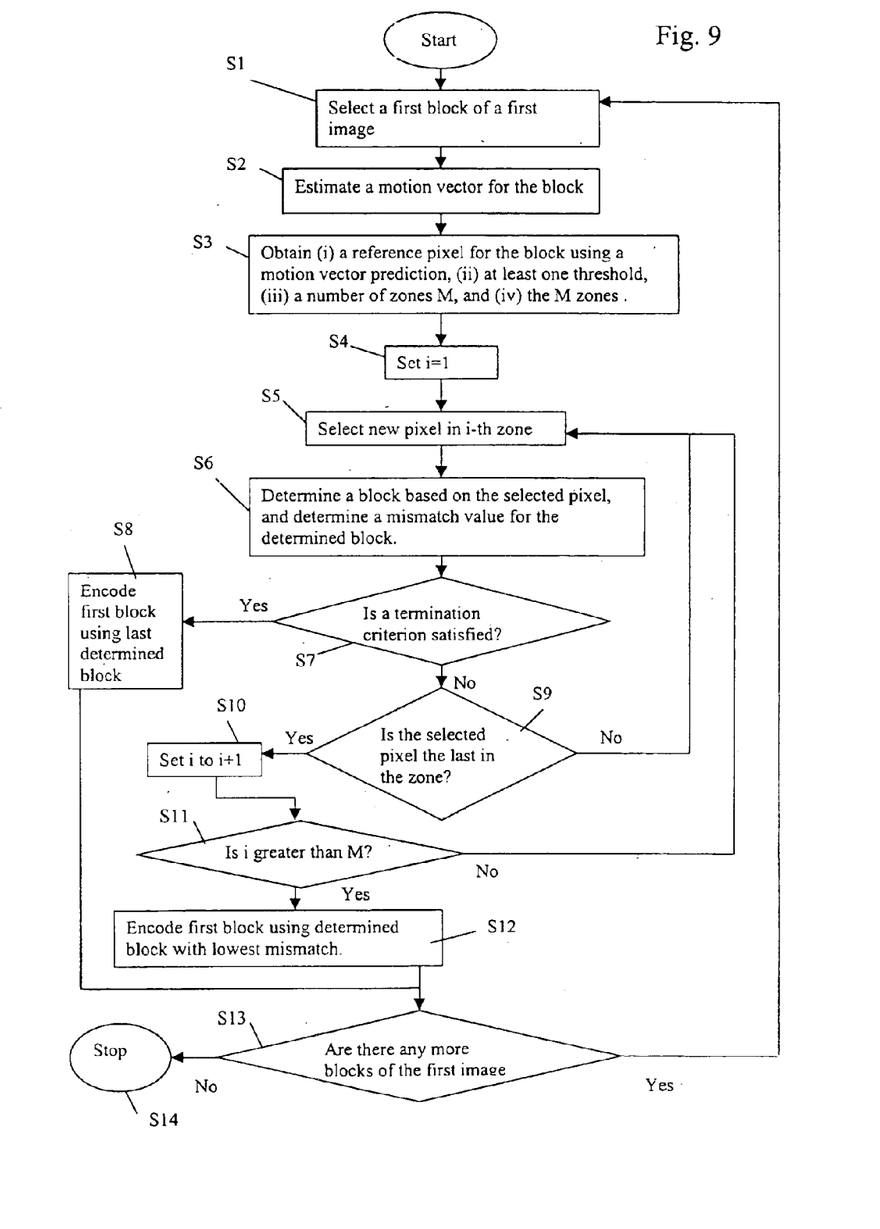
FIG. 9 is a flow chart of a method according to the invention.

FIG. 9 is a flowchart showing steps of a method which is an embodiment of the invention. In step S1 a first block of a first image is selected (a block of the first image which has not yet been encoded). In step S2 a motion vector associated with the block is estimated. In step S3 a reference pixel for the block is defined using the motion vector, at least one threshold is derived using the mismatch of at least one previous block of the first image (e.g. the adjacent block), a number of zones M is defined, and those M zones are themselves defined.

In step S4 the index i is set to 1. In step S5 a pixel in the i-th zone is selected. In step S6 a block of the second image is determined based on the pixel selected in step S5, and a mismatch is calculated between the determined block and the first block selected in step S1. In step S7 it is determined whether a termination criterion is satisfied. If so, in step S8 the first block is encoded using the block determined in step S6, and the method then proceeds to step S13. If not, in step S9 it is determined whether the pixel selected in step S5 was the last pixel of the i-th zone. If not, the method loops back to step S5 and a new pixel is selected. If so, the method proceeds to step S10 in which i is incremented by 1. In step S11 it is determined whether this means that i is above M (i.e. all the zones have already been explored). If not, then the method loops back to step S5, to select a pixel of the new i-th zone. If so, the first block is encoded using the one of the block(s) determined in step S6 for which the mismatch was the lowest.

In step S13 it is determined whether there are any blocks of the first image which have not yet been encoded. If so, the method loops back to step S1, in which a (new) first block of the image is selected. If not the method passes to step S14, and stops.

It is to be understood that this flow diagram is not exhaustive, and that the embodiment may include further steps which are not illustrated, as described in the embodiments of the invention described earlier.

Although the invention is described in these appendices with reference to particular embodiments, many variations are possible within the scope of the invention as will be clear to a skilled person. For example, the use of byte-based SIMD architecture and instructions (as employed in U.S. Pat. No. 5,764,787, which is discussed above) can increase the speed of the algorithm. Furthermore, the present invention is suitable also in the context of multiframe algorithms, described above.

INDUSTRIAL APPLICABILITY

The proposed fast motion estimation algorithm can be incorporated as video encoder/transcoder devices or systems, into digital camcorders, video conferencing systems, video broadcasting/production equipment, video editing systems, recordable DVD player/recorders, video encoding PC cards, etc. It can be used in ASIC chip designs, DSP-based prototyping systems, PC-based systems, etc.

The video encoder/transcoder systems may be ISO MPEG-1 compliant or MPEG-1-like., ISO MPEG2 compliant or MPEG-2-like, ISO MPEG-4 compliant or MPEG4-like, ISO MPEG-7 compliant or MPEG-7-like. They may also be ITU-T H.261 compliant or H. 261-like, ITU-T H.263 compliant or H.263 like, or ITU-T H.263+ compliant or H.263+-like.

What is claimed is:

1. A method of selecting, for a first block of a first image based on an array of pixels, a similar block of a second image based on said array of pixels, the method including:
    (i) defining a reference pixel in said array;
    (ii) deriving at least one threshold value based on a previously-derived mismatch value for at least one further block of the first image;
    (iii) defining a plurality of search zones in said array, labelled by integer index i, said zones surrounding said reference pixel and having a radius which increases for increasing i;
    (iv) after step (ii), for successive zones, and for successive pixels in each zone, determining a block of the second image based on each successive pixel of said successive pixels, and determining a mismatch value between said first block of the first image and said determined block based on a mismatch criterion; and
    (v) selecting said similar block of the second image as the determined block for which said determined mismatch is lowest;
    wherein step (iv) is terminated upon at least one termination criterion being satisfied, said termination criterion being defined in terms of a respective said threshold value based on a previously-derived mismatch value.

2. A method according to claim 1 in which in step (ii) said at least one further block of the first image is adjacent said first block of the first image.

3. A method of encoding a first image which includes defining successive blocks of the first image, and for each block of the first image:
    selecting the similar block of a second image by a method according to claim 1; and
    encoding the block of the first image as data specifying the similar block of the second image, and the data specifying differences between the block of the first image and the similar block of the second image.

4. A computer-readable medium storing computer-executable program code for performing a method according to claim 1, whereby execution of the code by a processor causes the processor to select the similar block of the second image.

5. A method according to claim 1 in which step (ii) further comprises using previously-derived motion vector values of two or more further blocks of the first image adjacent said first block to derive a further termination value, wherein step (iv) is terminated when either of the following conditions is met:
    (1) at least one termination criterion being satisfied, said termination criterion being defined in terms of a respective said threshold value based on a previously-derived mismatch value; or
    2) at least one further termination criterion is satisfied, said further terminates criterion being defined in terms of said further termination value.

6. A method according to claim 5 in which the further termination value is an integer value, and said further termination criterion is satisfied when said mismatch value has been determined for each successive pixel in a number of successive zones equal to said integer value.

7. A method of selecting, for a first block of a first image based on an array of pixels, a similar block of a second image based on said array of pixels, the method including:
    (i) defining a reference pixel in said array;
    (ii) deriving at least one threshold value based on a mismatch value of a second block of the first image adjacent said first block;
    (iii) defining a plurality of search zones in said array, labelled by integer index i, said zones surrounding said reference pixel and having a radius which increases for increasing i;
    (iv) after step (ii), for successive zones, and for successive pixels in each zone, determining a block of the second image based on each successive pixel of said successive pixels, and determining a mismatch value between said first block of the first image and said determined block based on a mismatch criterion; and
    (v) selecting said similar block of the second image as the determined block for which said determined mismatch is lowest;
    wherein step (iv) is terminated upon at least one termination criterion being satisfied, said termination criterion being defined in terms of a respective said threshold value based on a previously-derived mismatch value.

8. A method of encoding a first image which includes defining successive blocks of the first image, and for each block of the first image:
    selecting the similar block of a second image by a method according to claim 7; and
    encoding the block of the first image as data specifying the similar block of the second image, and the data specifying differences between the block of the first image and the similar block of the second image.

9. A computer-readable medium storing computer-executable program code for performing a method according to claim 7, whereby execution of the code by a processor causes the processor to select the similar block of the second image.

10. A method according to claim 7 in which in step (i) said reference pixel is defined based on an estimated motion vector associated with said first block.

11. A method according to claim 7 in which prior to step (iii) a step is performed of deriving a zone number M, and in step (iii) the number of said successive zones is M.

12. A method of selecting, for a first block of a first image based on an array of pixels, a similar block of a second image based on said array of pixels, the method including:

(i) defining a reference pixel in said array;

(ii) deriving at least one threshold value based on a mismatch value of a second block of the first image adjacent said first block and deriving at least one further threshold value using a previously-derived mismatch value of a block of a third image corresponding in position to said first block of the first image;

(iii) defining a plurality of search zones in said array, labeled by integer index i, said zones surrounding said reference pixel and having a radius which increases for increasing i;

(iv) after step (ii), for successive zones, and for successive pixels in each zone, determining a block of the second image based on each successive pixel of said successive pixels, and determining a mismatch value between said first block of the first image and said determined block based on a mismatch criterion; and (v) selecting said similar block of the second image as the determined block for which said determined mismatch is lowest;

wherein step (iv) is terminated upon any of a plurality of one termination criterion being satisfied, at least one said termination criterion being defined in terms of a respective said threshold value and at least one said termination criterion being defined in terms of a respective said further threshold value.

13. A method according to claim 12 in which the third image is equivalent to a predecessor of the first image.

14. A method of encoding a first image which includes defining successive blocks of the first image, and for each block of the first image:

selecting the similar block of a second image by a method according to claim 12; and encoding the block of the first image as data specifying the similar block of the second image, and the data specifying differences between the block of the first image and the similar block of the second image.

15. A computer-readable medium storing computer-executable program code for performing a method according to claim 12, whereby execution of the code by a processor causes the processor to select the similar block of the second image.

* * * * *